United States Patent [19]

Glier et al.

[11] Patent Number: 5,479,574
[45] Date of Patent: Dec. 26, 1995

[54] METHOD AND APPARATUS FOR ADAPTIVE CLASSIFICATION

[75] Inventors: Michael T. Glier, Chepachet; Linda I. Mensinger Nunez, North Kingstown; Christopher L. Scofield, Providence, all of R.I.

[73] Assignee: Nestor, Inc., Providence, R.I.

[21] Appl. No.: 42,232

[22] Filed: Apr. 1, 1993

[51] Int. Cl.[6] .................................................. G06F 15/18
[52] U.S. Cl. .................................................. 395/23; 395/27
[58] Field of Search .................................... 395/23, 27

[56] References Cited

U.S. PATENT DOCUMENTS

| | | | |
|---|---|---|---|
| 3,601,811 | 12/1968 | Yoshino | 340/172.5 |
| 3,638,196 | 1/1972 | Nishiyama et al. | 340/172.5 |
| 3,950,733 | 4/1976 | Cooper et al. | 340/172.5 |
| 4,044,243 | 8/1977 | Cooper et al. | 235/152 |
| 4,254,474 | 3/1981 | Cooper et al. | 364/900 |
| 4,319,331 | 3/1982 | Elbaum et al. | 364/515 |
| 4,326,259 | 4/1982 | Cooper et al. | 364/715 |

(List continued on next page.)

FOREIGN PATENT DOCUMENTS 0520925 12/1992 European Pat. Off. ................. 395/27

OTHER PUBLICATIONS

D. F. Specht, "Probabilistic Neural Network for Classification, Mapping, or Associative Memory," IEEE Int'l. Conf. on Neural Networks, Jul. 1988, pp. I–525–I–532.

Chin S. Park, et al. U. S. Patent Application for Distance Calculating Neural Network Classifier Chip and System, Date of Deposit Jul. 1, 1993, total pages 108.

Hernan A. Castro, U. S. Patent Application for Neural Network Employing Absolute Value Calculating Synapse, Date of Deposit May 19, 1992, total pages 16.

Daniel Seligson, U. S. Patent Application for Neural Network Incorporating Difference Neurons, Date of Deposit Apr. 29, 1991, total pages 42.

Daniel Seligson, U. S. Patent Application for Neural Cells and Networks with Multiplexed Synapses, Date of Deposit Dec. 6, 1991, total pages 22.

C. L. Scofield, "Unsupervised Learning in the N–Dimensional Coulomb Network", (Abstract Only), Sep., 1988.

C. L. Scofield, "A Mean Field Theory of Layer IV of Visual Cortex and Its Application to Artificial Neural Networks", 1988.

M. Glier, "Artificial Neural Network VLSI Chip Development" Apr. 2, 1992, pp. 1–30.

"Ni1000 Adaptive Classifier, Preliminary Target Specification", Aug. 26, 1992, pp. 1–1 through 5–12.

C. Park, "Ni1000 Micro–Controller Design Review", Jun. 25, 1992.

D. L. Reilly, L. N. Cooper, C. Elbaum, "A Neural Model for Category Learning," Biological Cybernetics, 1982, pp. 35–41.

C. M. Bachman, L. N. Cooper, A Dembo, O. Zeitouni, "A Relaxation Model for Memory with High Density Storage," Proc. Natl. Acad. Sci. USA 21, Nov., 1987.

D. L. Reilly, C. Scofield, C. Elbaum, L. N. Cooper, "Learning System Architectures Composed of Multiple Learning Modules," IEEE First Int'l Conf. on Neural Networks, Jun. 1987, pp. 495–503.

(List continued on next page.)

Primary Examiner—Robert W. Downs
Attorney, Agent, or Firm—Weingarten, Schurgin, Gagnebin & Hayes

[57] ABSTRACT

A neural network and method for pipeline operation within a neural network which permits rapid classification of input vectors provided thereto is disclosed. In a training mode, a plurality of training input features are presented to the neural network and distances between the plurality of training features and a plurality of prototype weight values are concurrently computed. In response to an indication of a last training epoch count values for each of the prototype weight values are stored in a memory to thereby allow the neural network to operate in a probabilistic classification mode.

4 Claims, 9 Drawing Sheets

U.S. PATENT DOCUMENTS

| | | | |
|---|---|---|---|
| 4,660,166 | 4/1987 | Hopfield | 364/807 |
| 4,760,604 | 7/1988 | Cooper et al. | 382/15 |
| 4,866,645 | 9/1989 | Lish | 364/602 |
| 4,876,731 | 10/1989 | Loris et al. | 382/40 |
| 4,893,333 | 1/1990 | Baran et al. | 379/100 |
| 4,897,811 | 1/1990 | Scofield | 364/900 |
| 4,904,881 | 2/1990 | Castro | 307/201 |
| 4,906,865 | 3/1990 | Holler | 307/353 |
| 4,920,426 | 4/1990 | Hatori et al. | 358/433 |
| 4,937,872 | 6/1990 | Hopfield et al. | 381/43 |
| 4,950,917 | 8/1990 | Holler et al. | 307/201 |
| 4,956,564 | 9/1990 | Holler et al. | 307/201 |
| 4,958,375 | 9/1990 | Reilly et al. | 382/14 |
| 4,961,002 | 10/1990 | Tam et al. | 307/201 |
| 4,994,982 | 2/1991 | Duranton et al. | 364/513 |
| 4,999,525 | 3/1991 | Park et al. | 307/201 |
| 5,003,360 | 3/1991 | Okada et al. | 357/22 |
| 5,004,932 | 4/1991 | Nejime | 307/201 |
| 5,010,512 | 4/1991 | Hartstein et al. | 364/807 |
| 5,014,096 | 5/1991 | Matsuda et al. | 357/19 |
| 5,014,219 | 5/1991 | White | 364/513 |
| 5,021,693 | 6/1991 | Shima | 307/494 |
| 5,021,988 | 6/1991 | Mashiko | 364/807 |
| 5,028,810 | 7/1991 | Castro et al. | 307/201 |
| 5,028,969 | 7/1991 | Kashara et al. | 357/19 |
| 5,031,154 | 7/1991 | Watanabe | 367/8 |
| 5,039,870 | 8/1991 | Engeler | 307/201 |
| 5,039,871 | 8/1991 | Engeler | 307/201 |
| 5,039,941 | 8/1991 | Castro | 324/158 |
| 5,040,134 | 8/1991 | Park | 364/602 |
| 5,045,713 | 9/1991 | Shima | 307/201 |
| 5,054,093 | 10/1991 | Cooper et al. | 382/14 |
| 5,055,897 | 10/1991 | Canepa | 357/23.5 |
| 5,060,278 | 10/1991 | Fukumizu | 382/14 |
| 5,063,521 | 11/1991 | Peterson et al. | 395/27 |
| 5,067,164 | 11/1991 | Denker et al. | 382/15 |
| 5,073,867 | 12/1991 | Murphy et al. | 395/27 |
| 5,075,869 | 12/1991 | Holler et al. | 395/24 |
| 5,077,677 | 12/1991 | Hurphy et al. | 395/10 |
| 5,083,285 | 1/1992 | Shima et al. | 395/2410 |
| 5,087,826 | 2/1992 | Holler et al. | 307/201 |
| 5,095,443 | 3/1992 | Watanabe | 395/11 |
| 5,095,457 | 3/1992 | Jeong | 364/758 |
| 5,103,405 | 4/1992 | Murphy et al. | 395/10 |
| 5,129,038 | 7/1992 | Kohda et al. | 395/23 |
| 5,136,176 | 8/1992 | Castro | 307/201 |
| 5,136,177 | 8/1992 | Castro | 307/201 |
| 5,136,178 | 8/1992 | Castro | 307/201 |
| 5,140,538 | 8/1992 | Bass et al. | 364/602 |
| 5,142,666 | 8/1992 | Yoshizawa et al. | 395/24 |
| 5,146,542 | 9/1992 | Engeler | 395/24 |
| 5,146,602 | 9/1992 | Holler et al. | 395/23 |
| 5,148,514 | 9/1992 | Arima et al. | 395/24 |
| 5,151,874 | 9/1992 | Jeong et al. | 364/752 |
| 5,151,970 | 9/1992 | Engeler | 395/24 |
| 5,151,971 | 9/1992 | Jousselin et al. | 395/27 |
| 5,155,377 | 10/1992 | Castro | 307/201 |
| 5,157,275 | 10/1992 | Stork et al. | 307/201 |
| 5,165,009 | 11/1992 | Watanabe et al. | 395/27 |
| 5,165,010 | 11/1992 | Masuda et al. | 395/27 |
| 5,166,539 | 11/1992 | Uchimura et al. | 307/201 |
| 5,166,938 | 11/1992 | Chung | 371/37.1 |
| 5,167,006 | 11/1992 | Furuta et al. | 395/11 |
| 5,167,008 | 11/1992 | Engeler | 395/27 |
| 5,168,551 | 12/1992 | Jeong | 395/27 |
| 5,175,793 | 12/1992 | Sakamoto et al. | 395/2 |
| 5,175,858 | 12/1992 | Hammerstrom | 395/800 |
| 5,177,746 | 1/1993 | Chung | 371/37.1 |
| 5,179,596 | 1/1993 | Weingard | 382/15 |
| 5,187,581 | 2/1993 | Kamatani | 358/213.11 |
| 5,187,680 | 2/1993 | Engeler | 364/807 |
| 5,191,637 | 3/1993 | Furuta et al. | 395/27 |
| 5,195,169 | 3/1993 | Kamiya et al. | 395/23 |
| 5,222,193 | 6/1993 | Brooks et al. | 395/23 |
| 5,237,210 | 8/1993 | Castro | 307/201 |
| 5,247,206 | 9/1993 | Castro | 307/201 |
| 5,247,606 | 9/1993 | Tam | 395/24 |
| 5,255,346 | 10/1993 | Wu et al. | 395/23 |
| 5,256,911 | 10/1993 | Holler et al. | 307/201 |
| 5,264,734 | 11/1993 | Holler et al. | 307/201 |
| 5,268,320 | 12/1993 | Holler et al. | 437/43 |
| 5,276,772 | 1/1994 | Wang et al. | 395/24 |
| 5,293,454 | 3/1994 | Kamiya | 395/23 |

OTHER PUBLICATIONS

C. L. Scofield, D. L. Reilly, C. Elbaum, L. N. Cooper, "Pattern Class Degeneracy In An Unrestricted Storage Density Memory," 1987.

R. Rimey, P. Gouin, C. Scofield, D. L. Reilly, "Real–time 3–D Object Classification Using A Learning System", Intelligent Robots and Computer Vision, Oct., 1986, pp. 552–557.

D. L. Reilly, C. Scofield, P. R. Gouin, R. Rimey, E. A. Collins, S. Ghosh, "An Application of a Multiple Neural Network Learning System to Industrial Part Inspection," 1988, pp. 1–14.

E. Collins, S. Shosh, C. L. Scofield, "An Application of a Multiple Neural Network Learning System to Emulation of Mortgage Underwriting Judgements," Jul., 1988.

C. L. Scofield, "Learning Internal Representations in the Coulomb Energy Network," Jun., 1987.

D. L. Reilly, L. N. Cooper, "An Overview of Neural Networks: Early Models to Real World Systems," An introduction to Neural and Electronic Networks, 1990, pp. 227–247.

P. D. Zemany, D. Reilly, E. C. Real, D. P. Morgan, L. Riek, C. S. Scofield, et al., "Experiments in Discrete Utterance Recognition using Neural Networks," Feb., 1989, pp. 1–2.

D. P. Morgan, C. L. Scofield, T. M. Lorenzo, E. C. Real, D. P. Loconto, "A Keyword Spotter Which Incorporates Neural Networks for Secondary Processing," Apr., 1990.

D. L. Reilly, E. Collins, C. L. Scofield, S. Ghosh, P. Stefancyk, "Risk Assessment of Mortgage Applications with as Neural Network System: An Update as the Test Portfolio Ages," IJCNN, Jan., 1990.

David W. Tank and John J. Hopfield, "Collective Computation in Neuronlike Circuits", Scientific American, Dec., 1987, pp. 104–114.

Commercial Applications of the Nestor Learning System, 1989, pp. 1–28.

Learning Systems Based on Multiple Neural Networks, 1988, pp. 1–14.

C. L. Scofield and Douglas L. Reilly, "Into Silicon: Real Time Learning in a High Density RBF Neural Network". Jul., 1991.

D. P. Morgan, C. L. Scofield, J. E. Adock, "Multiple Neural Network Topologies Applied to Keyword Spotting". May, 1991.

C. L. Scofield, L. Kenton, J. Chang, "Multiple Neural Net Architectures for Character Recognition", Feb., 1991.

METHOD AND APPARATUS FOR ADAPTIVE CLASSIFICATION

FIELD OF THE INVENTION

This invention relates to adaptive classification systems and more particularly to neural networks.

BACKGROUND OF THE INVENTION

As is known in the art, there exists a class of circuits and systems which emulate higher order brain functions such as memory, learning and or pattern perception/recognition. Such systems are generally referred to as neural networks or adaptive classifiers. Neural networks may be trained to model regions in which particular features or characteristics of an input signal are distributed. By having an accurate model of such regions, a neural network may thus recognize if unknown data fed thereto belongs to a particular class represented by the modelled region.

Such modeling is accomplished by presenting to the neural network a number of training signals belonging to known classes of interest. Each of the training signals is provided having a predetermined number of preselected characteristics or features. During a training mode, each of the features and the class to which a signal having such features belongs are provided to the neural network. The neural network stores the information and thus generates a model of the region which includes signals of a particular class.

Typically however, the neural network includes a plurality of modeled regions which represent a corresponding plurality of different classes. In many practical problems such modeled regions have overlapping portions. When an unknown input signal has characteristics which map into a region where no overlap exists among the portions the neural network is able to classify the unknown input signal into one of the classes.

However, when the unknown signal has characteristics which map the signal into a region where portions of the different classes overlap, the neural network is unable to classify the unknown input signal with certainty, because the region belongs to more than one class. Thus, the network provides acceptable results when class regions are separable, that is, when no overlap exists between the class regions.

One approach to solving this problem caused by overlapping class regions is by using a so-called Probabilistic Neural Network (PNN). The PNN approach Computes probability estimates by requiring each pattern in the training set to be stored in a first layer of weights.

One problem with this approach however, is that in some applications a large number of training patterns must be used. In many practical neural network applications, the number of training patterns is an exponential function of the number of input features. Thus, practical problems generally require a prohibitively large number of training patterns which make implementation of a probabilistic neural network impractical.

Due to the large number of training patterns required, a relatively large amount of memory is required. In some applications the amount of available memory may be limited. Furthermore, memory size is especially important when it is desirable to manufacture the neural network as an integrated circuit.

Moreover, in some applications such as large-scale pattern classification tasks, it may be desirable to provide a neural network which may operate on a real-time basis. To achieve real time operation in such applications however, the neural network must be capable of processing information in a relatively rapid manner. Thus, to meet such processing speed requirements it may be desirable to provide a neural network as a semiconductor integrated circuit.

However, due to the complexity of the resultant circuits associated with the use of predecessor neural network architecture, it has been relatively difficult to construct a neural network integrated circuit which was useful for typical classification problems. Neural networks able to operate in a wide variety of processing applications generally have neural network architectures requiring a relatively large number of processing element inter-connectivity. This results in a reduction of the number of processing elements which may be practically implemented in an integrated circuit using present manufacturing techniques.

It would thus be desirable to provide an adaptive classification system as an integrated circuit device which is capable of resolving ambiguities which occur when class distributions overlap and prototypes from more than one class are likely to fire at the same time in response to a single unknown input pattern.

SUMMARY OF THE INVENTION

In accordance with the present invention, a neural network and methods of operation within such a network are disclosed. The neural network is provided having an input layer, a middle layer and an output layer. A method of operating the network includes the steps of presenting an input vector having a plurality of training features to the neural network, concurrently computing distances between a plurality of said training features and a plurality of prototype weight values and in response to an indication of a last training epoch, storing a count value corresponding to the number of occurences of an input vector within a prototype. With this particular arrangement a probabilistic neural network is provided. The network may perform a plurality of pipeline operations to permit real time classification in response to applied input vectors.

The neural network may include a prototype memory having a plurality of weight values stored therein. A distance calculation unit is coupled to the prototype memory and to a math unit. The distance calculation unit may perform a plurality of concurrent calculations to compute a distance between an input vector and each of the plurality of weight values stored in the prototype memory.

The method and apparatus in accordance with the present invention may be fabricated as an integrated circuit device to permit classifications to be performed at high speed and thus permit utilization of the device for numerous classifications which were heretofore difficult to perform using conventional neural networks.

Furthermore, other learning algorithms may be seamlessly accommodated via a programmable resident microcontroller. For example, a probabilistic neural network (PNN) may be incorporated into the network via an RCE procedure by setting the initial value of the middle-layer cell thresholds to zero. This will cause the addition of a new middle-layer cell with the presentation of each new training pattern. Thus the middle-layer cells act as storage elements for the full training set. A second layer of cells compute a distribution (activation) function such as a Gaussian or an exponential decay. Similarly, the output layer cells compute a linear sum of the middle layer activations. Since the full training set has been stored within the middle layer, the output cells compute weighted sums where the sum occurs over all patterns in the training set.

BRIEF DESCRIPTION OF THE DRAWINGS

The foregoing features of this invention as well as the invention itself may be more fully understood from the following detailed description of the drawings in which

Referring now to FIG. 1, a feedforward, three layer neural network 10 includes an input layer 12 having a first plurality of cells 12a–12N. Each of the input layer cells 12a–12N receives one of a plurality of input features $f_a$–$f_N$ provided thereto. A prototype layer 14 includes a second plurality of cells 14a–14M. Each of the cells 14a–14M are coupled to at least one of the input layer cells 12a–12N. A classification layer 16 has a third plurality of cells 16a–16L with particular ones of the cells 16a–16L coupled to at least one of the prototype layer cells 14a–14M.

Figure 1:
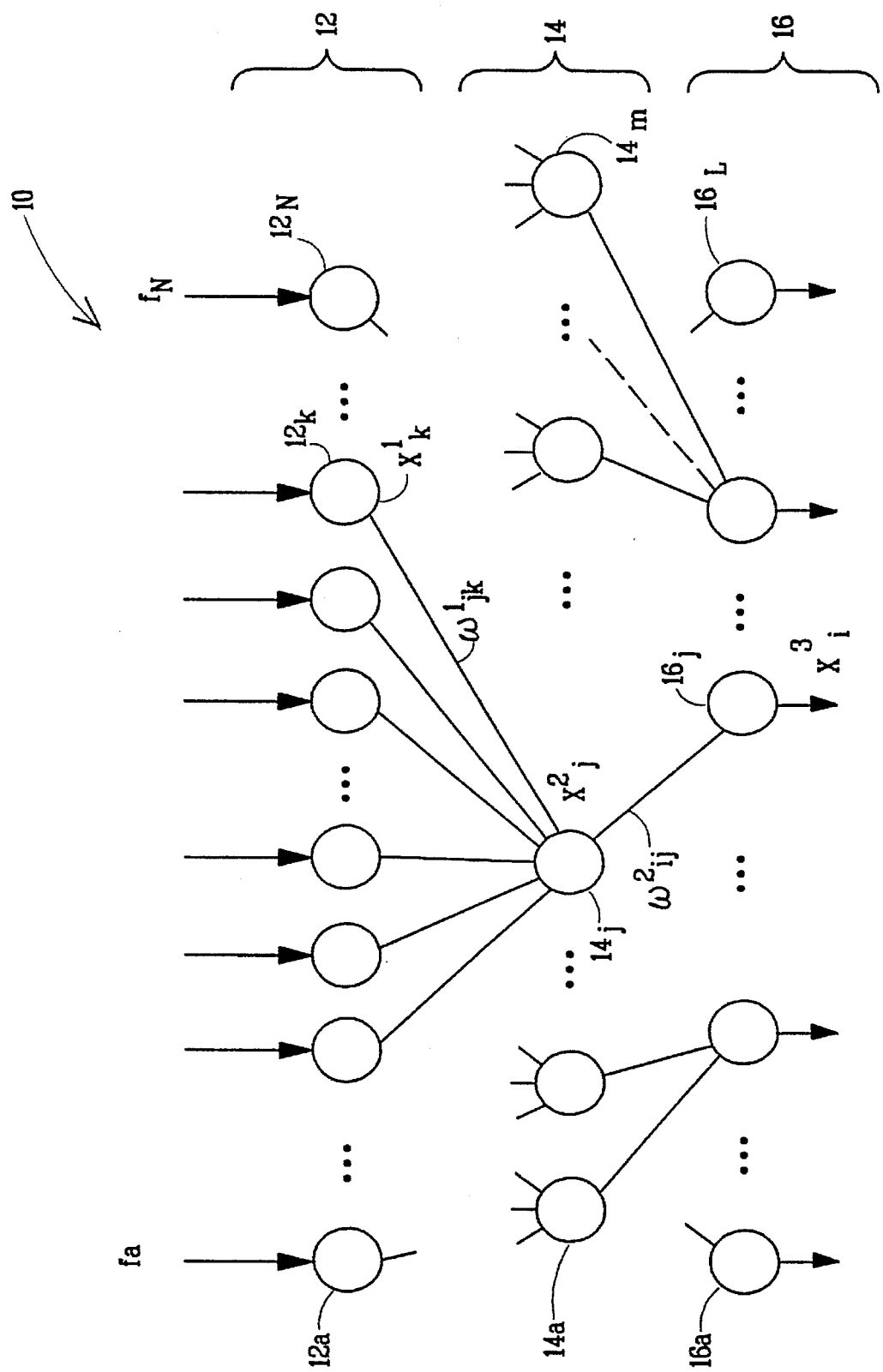
FIG. 1 is a block diagram of a Probabilistic Restricted Coulomb Energy neural network.

The input layer cells 12a–12N are coupled to particular ones of the prototype layer cells 14a–14M and particular ones of the prototype layer cells 14a–14M are coupled to particular ones of the output layer cells 16a–16L during a learning or training process. Briefly, the neural network learns by having example network patterns and known classifications provided thereto. The training process will be described further below in conjunction with FIG. 6. Suffice it here to say that the layers 12–16 are coupled via the cells 12a–12N, 14a–14M, and 16a–16L such that when the network 10 operates in a classification mode and the input layer 12 receives a plurality of features from an unknown input signal, the classification layer 16 provides an output signal indicative of a class to which the input signal belongs.

The middle layer cells 14a–14M may be provided as radius limited perceptrons and the output layer cells 16a–16L may correspond to inner product cells. A feedforward, three-layer neural network which combines radius-limited perceptrons with inner-product perceptrons may generally be referred to as a radial basis function (RBF) neural network.

In the RBF network 10, the input layer cells 12a–12N transmit an input pattern vector to each of the cells in the second layer. Denoting an exemplary one of the second layer cells 14a–14M as $X^2_j$ where the superscript 2 identifies the layer index and the subscript j identifies the cell number, the second layer cells 14a–14M may be provided as radius-limited perceptrons which compute activations according to:

$$X^2_j = exp(-\sigma d^2_j) \quad \text{Equation (1)}$$

in which:

σ corresponds to a smoothing constant selected to minimize the error classification of a know testing example; and $d^2_j$ corresponds to a distance which may be computed according to Equation 2:

$$d^2_j = \sum_{i}^{N} |f_i - \omega^1_{ij}| \quad \text{Equation (2)}$$

in which:

N corresponds to the number of input features;

$\omega^k$ refers to the weight matrix connecting the $k^{th}$ layer to the $(K+1)^{th}$ layer.

Thus in the neural network 10, the activation function of each of the second layer cells 14a–14M is provided as an exponential function as shown in Equation 1.

The activation function of the third layer cells corresponds to an identity function such that:

$$X^3_i = \sum_{j=1}^{N} \omega^2_{ij} X^2_j \quad \text{Equation (3)}$$

in which:

the sum is over the cells connected to $X^3_i$ during training That is, the summation is over only those cells which the output layer cell $X^3_i$ is wired to as a result of training The output layer 16 thus computes a weighted sum of outputs. Thus in a probabilistic RCE computation, $$d_j = \sum_{i=1}^{N} |u_i - P_{ij}| \quad \text{Equation (4)}$$

in which:

N corresponds to the number of possible input features;

j takes on values from 1 to M;

$u_i$=an input vector element; and $P_{ij}$=a stored prototype vector element

A probability density function (pdf) comprises a plurality of elements which may be expressed as:

$$pdf_j = C_j e^{-kd_j} \quad \text{Equation (5)}$$

in which:

$C_j$ corresponds to a scalar value representative of the frequency of occurrence of a training vector from a particular class in a particular prototype. The $C_j$ values are stored in the weights $\omega^2_{ij}$. Such storage of scalar representative values of frequency of occurrence in the weight values avoids the need to store a prototype for each training feature vector. Furthermore, storage of the weight values is economical in terms of storage space required to provide a probabilistic computation.

The pdf for a particular class is thus provided as:

$$pdf_c = \Sigma \, pdf_k$$

in which c is one of L classes.

k corresponds to the kth prototype belong to class C.

Thus in a neural network able to accept, for example, a maximum of 256 input features and identify a maximum of 64 classes and generate a maximum of 1024 prototypes then maximum values for L, M and N correspond to N=256, M=1024 and L=64.

Non separable class regions may be characterized by probability density functions which specify the dependance of the distribution for a class C on a random input pattern f. By computing scalar values corresponding to probability density functions (pdfs) the neural network 10 may provide an output signal even in those applications which include class regions which share points in a feature space (i.e. non separable regions). Thus, when portions of the class regions are not separable, the neural network 10 may estimate the probability that the random input pattern belongs to a particular class.

To provide such an estimation, Bayes rule for classification may be applied to patterns which occur in the non-separable regions if the probability density functions are known. Thus, an unknown input signal which falls within an overlapping class region belongs to class A if:

$$p(x|A)P_A > p(x|B) P_B \quad \text{Equation (6)}$$

in which:

$p(x|A)$ corresponds to the probability density function of A;

$P_A$ corresponds to the a priori features for Class A;

$p(x|B)$ corresponds to the probability density function of B; and $P_B$ corresponds to the a priori features for Class B.

Figure 2:
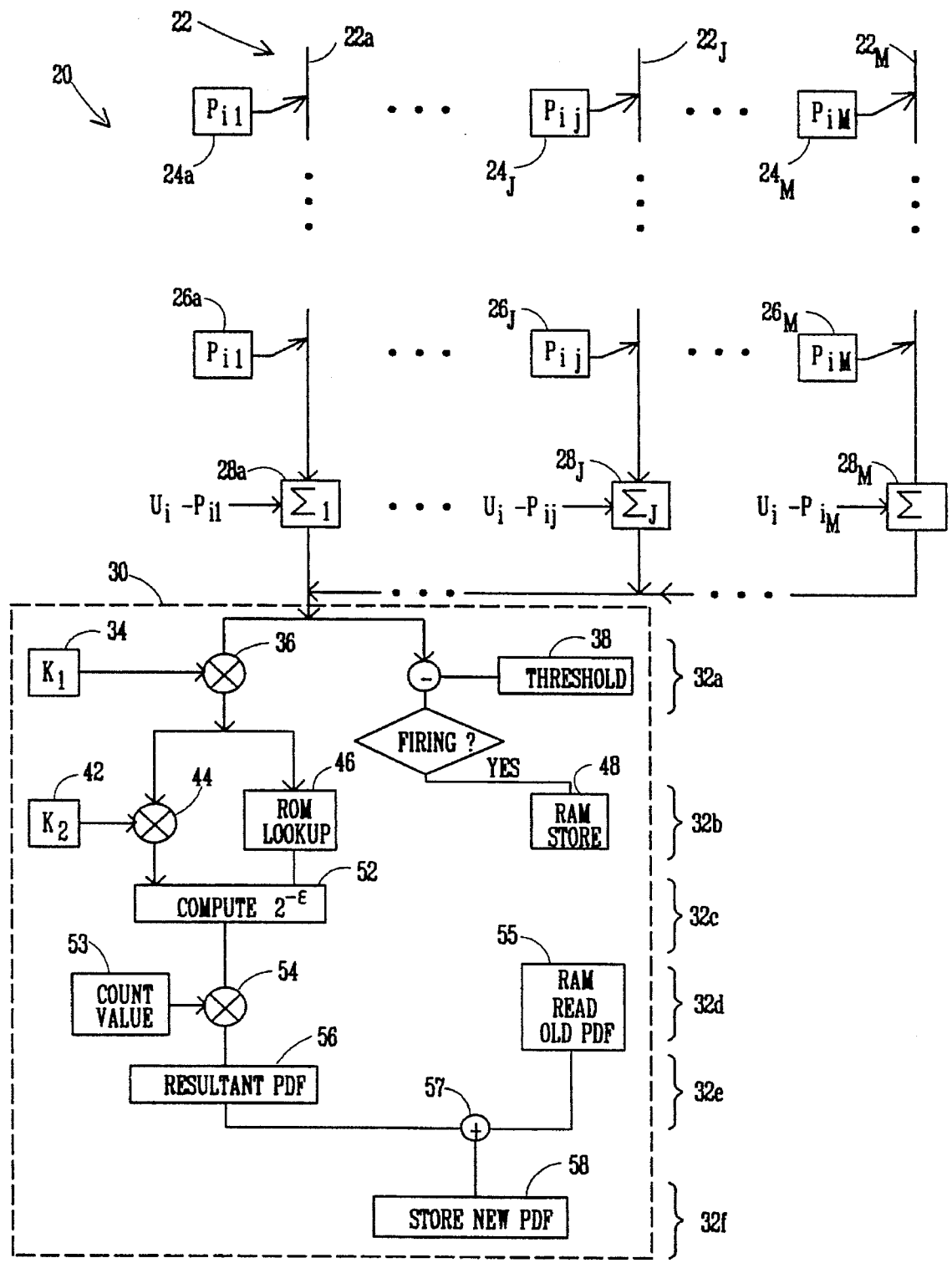
FIG. 2 is a schematic diagram of a probabilistic Restricted coulomb Energy architecture.

Referring now to FIG. 2, a Probabilistic Restricted Coulomb Energy (PRCE) neural network 20 includes a plurality of prototypes 22a–22M each of which associates with a corresponding one of a plurality of summing circuits 28a–28M, generally denoted 28. Each of the prototypes 22a–22M has associated therewith a plurality of weights having weight values $P_{ij}$. For example prototype $22_J$ has associated therewith, a plurality of weights $P_{ij}$ denoted as $24_J$–$26_J$. A plurality of features $U_i$ (i=1–N), representative of an input signal U, are each simultaneously fed to the M summing circuits 28 to be compared in turn to N weights $P_{ij}$ for each prototype.

Each of the summing circuits 28 computes the sums of differences between each of the features $U_i$ and the weights 24–26. It should be noted that each of the plurality of input features $U_i$ are sequentially fed simultaneously to each of the plurality of summing circuits $28_i$ to be compared with weights $P_{ij}$.

The summing circuits 28a–28M are coupled to a math unit 30. The math unit 30 operates as a six stage pipeline in which one exponential operation, three multiplication operations, one summation operation and one comparison operation are performed. The math unit 30 thus includes a plurality of sublayers or stages 32a–32f. In each of the stages 32a–32f, one or a plurality of steps may take place simultaneously.

These steps implement the equations described above in conjunction with FIG. 1.

As mentioned above such computations are preferably performed in a pipeline operation. For example, each of the summing circuits 28a–28M sequentially feeds an input signal to the first layer 32a. In the first layer 32a a multiplication and a distance comparison are computed in parallel.

In layer 32b, a multiplication, a ROM lookup and a firing check may next be simultaneously performed.

In layer 32c, an exponential computation corresponding to that described in Equation (1) of FIG. 1 may be expressed as $2^e$ is performed.

In layer 32d, a count value is multiplied by the result of the exponentiation and the old PDF value is retrieved.

In layer 32e a resultant PDF value and the old PDF value are combined so that a new PDF value may be stored in a memory location as shown in layer 32f.

Thus, the neural network 20 receives a plurality of input pattern features $U_1$–$U_n$ and provides output classification information $PDF_1$–$PDF_L$. Based on the distances calculated between the input pattern features $U_1$–$U_N$ and each of the plurality of stored prototype weights $P_{ij}$, the neural network 20 provides output signals $PDF_1$–$PDF_L$ indicating the classes of prototype vectors that are in the proximity of the input vector U. The output signals $PDF_1$–$PDF_L$ may be used to compute a probability value indicating the probability that the input vector U belongs to a particular one of a plurality of possible classes. Thus, if an input vector falls in proximity to prototypes from more than one class, the neural network 20 may calculate the relative probability that the pattern is in a particular one of a plurality L of possible classes.

The maximum number of input pattern features may correspond, for example, to 256 and the maximum number of classes may correspond to 64 for example. One of ordinary skill in the art, however, will recognize that the techniques described herein are applicable to various sizes of input pattern features and classes.

Figure 3:
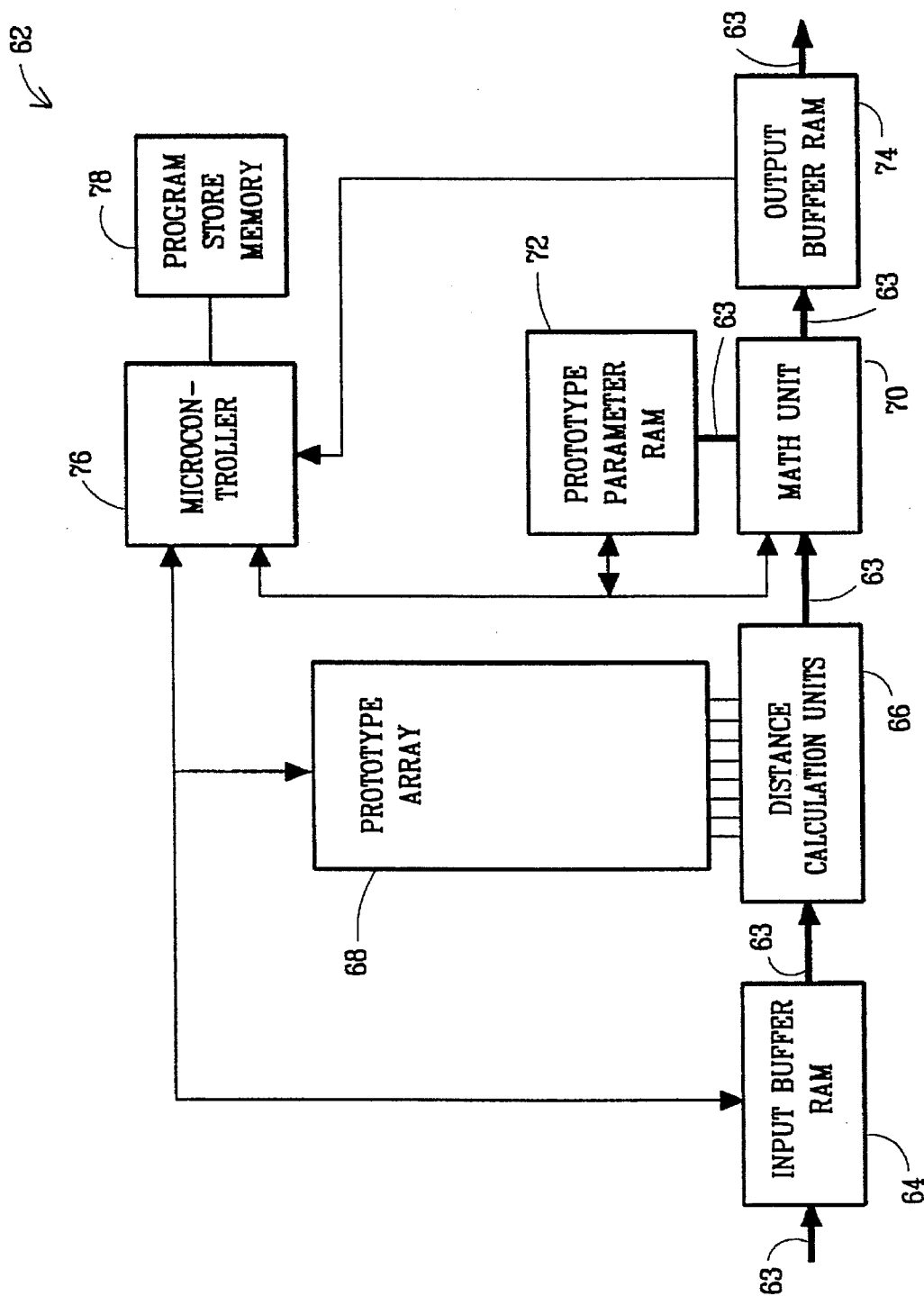
FIG. 3 is a block diagram of a neural network classification pipeline.

Referring now to FIG. 3, a neural network 62 operating according to a pipeline classification scheme includes an input buffer RAM 64 coupled to a distance calculation unit (DCU) 66. The distance calculation unit 66 is coupled to a nonvolatile prototype memory array 68 having a plurality of prototype weights stored therein. Such prototype weights are stored in the prototype array 68 during a learning mode as will be described further in conjunction with FIGS. 6 and 7 below. The DCU 66 is also coupled to a math unit (MU) 70. The math unit 70 is coupled to a prototype parameter RAM (PPRAM) 72 and an output buffer RAM 74. The prototype array 68 and PPRAM 72 have coupled thereto a microcontroller 76 and a program store memory 78 is coupled to the microcontroller.

The elements 64 through 78 which are interconnected to provide the network 62 will be described in further detail in conjunction with FIG. 4 below. The neural network 62 operates in a pipeline mode to rapidly perform classification tasks; that is, pipelined operations occur such that the neural network 62 is able to rapidly analyze and classify unknown data fed thereto.

Pipelining generally refers to a technique in which the output of one process serves as an input to a second process, the output of the second process serves as an input to a third process and so on. Such processes take place simultaneously within a single cycle time. In the neural network 62, pipelined operations occur on at least two levels. At a first level, pipelining occurs in the flow of data between the input buffer RAM 64 and the output buffer RAM 74 along pipeline path 63. On a second level, and as will be described further below, pipelined operations occur in the input and output buffer RAMs 64, 74 distance calculation unit 66 and the math unit 70.

The microcontroller 76 is coupled as shown to direct process steps during some non-classification and non-learning operating modes of the network 62. The microcontroller 76 does not control the flow of data through the pipeline, rather the pipeline operates autonomously. When the network 62 is in a learning or a classification mode, the microcontroller 76 is effectively detached from the elements in the pipeline path 63 in the learning and classification modes. The microcontroller 76 merely determines correct answers in the learning mode.

Thus the first level of pipelining includes, a first pipeline stage corresponding to a distance calculation stage of the pipeline during which time the distance calculation unit 66 computes distances. Simultaneously, in a second pipeline stage corresponding to a class probabilities pipeline stage, the math unit 70 computes class probabilities. Also simultaneously in a third pipeline stage corresponding to an input/output stage of the pipeline, the input buffer RAM 64 may receive input data fed thereto or the output buffer RAM 74 may transfer data out of the network 62 while the computations in the DCU 66 and MU 70 are taking place. Such input output transfers may take place simultaneously.

One pipeline step time may correspond, for example, to a predetermined number of clock cycles. For example, if one pipeline step time corresponds to 1024 clock cycles then in the neural network 62, a new classification may be available every 1024 clock cycles. The pipeline step with the longest required time determines how often a new classification may be available.

It should be noted that the time required to perform the input and output steps for one classification is relatively short when compared to the pipeline step time. That is, the time required to perform the input/output steps is a relatively low percentage of the time corresponding to the worst case pipeline step. Thus, the I/O processes performed in the input and output buffer RAMS 64, 74 respectively should not limit the throughput of the network 64.

Thus as will be described in conjunction with FIG. 5, when an array of parallel coupled neural networks are coupled to a system administrator, the system administrator is provided having adequate time in which to manage the array of parallel coupled neural networks 62 without causing any of the neural networks 62 to suspend their calculations due to waiting for I/O service.

The second level of pipelining occurs within the input buffer RAM 64, the DCU 66, the math unit 70 and the output buffer RAM 74. The input buffer RAM 63 may be provided having a pair of input buffers and thus is able to receive data while simultaneously providing data to the DCU 66. The DCU 66 performs parallel computations of distances between an input vector and each of the plurality of prototype weights stored in the prototype array 68.

The math unit 70 compares the distances computed by the DCU with the region of influence values of each of the prototype weights stored in the prototype array to determine if a prototype is firing. The math unit performs one pdf calculation/distance comparison per clock cycle. The MU 70 performs two multiplications, an exponential, a compare operation and an accumulate operation in the six stage pipeline. The output buffer RAM may be provided having a pair of output RAM units and thus is able to receive data from the math unit 70 while simultaneously providing output values from the pipeline.

Figure 4:
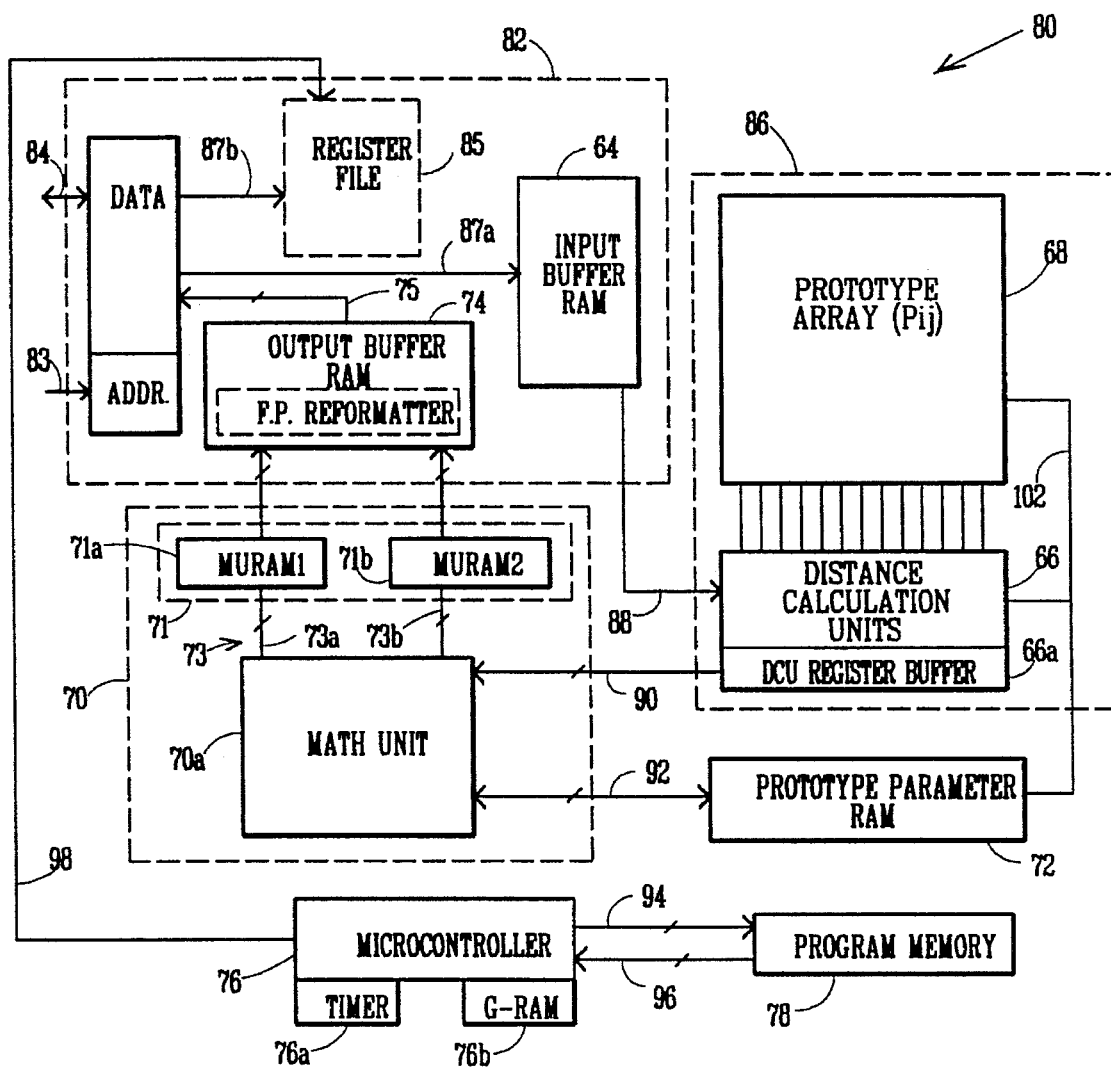
FIG. 4 is a block diagram of a neural network architecture.

Referring now to FIG. 4, in which like elements of the neural network 62 (FIG. 3) are provided having like reference designations, a neural network 80 includes an I/O unit 82 having a 64 bit configurable input/output data bus 84. The bus 84 may operate in a 32 bit or a 64 bit data transfer mode.

The I/O unit 82 further includes the input buffer RAM 64 and the output buffer RAM 74. Data is fed to the network 80 through the data bus 84 to the input buffer RAM 64. As mentioned in conjunction with FIG. 3 above, the input buffer RAM 64 may include a plurality of identical RAM blocks to allow pipelined operations to occur. The input buffer RAM 64 may be provided, for example, having a pair of RAM blocks to thus provide the input buffer as a 256×5×2 input buffer RAM 64.

In a learning mode, pattern data and class data are fed to the network 80 through the data bus 84. The pattern data is transmitted along a data path 87a to an addressed memory location in the input buffer RAM 64. The pattern data is thus fed directly to the input buffer RAM 64 through the data path 87a and is subsequently fed to the DCU 66.

The class data, on the other hand, is transmitted using an address of a register in a register file 85. The class data is thus provided to the register file 85 through a separate data path 87b.

The class data is not fed to the prototype array 68. Rather, the microcontroller 68 accesses the register file 85 to determine what class the data belongs to such that a class association may be set in the output unit 74. Thus the microcontroller 76 directs the learning process.

When the network 80 operates in a classify mode, the input data is fed directly from the bus 84 to the input buffer RAM 64 through the data path 87a.

The input buffer 64 receives data fed thereto and provides the data to the distance calculation unit 66 and the prototype array 68 (PADCU unit 86) through a five bit prototype input bus 88.

During the learning mode of the neural network 80, a plurality of learned cell weight values $P_{ij}$ and corresponding field of influence values $\lambda_j$ are generated. The cell weight values $P_{ij}$ are stored in the prototype array 68 and the region of influence values $\lambda_j$ are stored in the PPRAM 72. The cell weights are stored in the nonvolatile memory 68 to thus avoid any need to download previously stored values from an external source upon power up of the network 80.

In the present embodiment the prototype array 68 is has 256×1024 memory locations and each of the weights stored therein are represented by a 5 bit digital word. Those of ordinary skill in the art will recognize that the prototype array may be provided having any appropriately selected dimensions. Furthermore, fewer or more than 5 bits may be used, however, it has been found that 5 bits provides adequate resolution of typical pattern features and allows a relatively simple circuit design to be used. Thus, in this instance 1024 prototype vectors may be stored in the prototype array 68.

The DCU 66 calculates the city-block distance from a prototypical example stored in the prototype memory array 68 to a current input vector fed to the network 80. In the second level of pipelining the DCU 66 perform such calculations in parallel. That is, the DCU 66 includes a plurality of computation units which operate simultaneously. Thus, if the DCU 66 is provided having 512 of such computation units for example, then up to 512 distances may be concurrently computed in the DCU 66.

Since each of 1024 prototype vectors has 256 components, a total of 256×1024 subtract-accumulate operations should be executed to calculate the 1024 city-block distances. The DCU 66 executes a plurality of pipeline stages to provide one subtract-accumulate per clock cycle when the clock cycle is provided having two phases. The DCU 66 includes a DCU register buffer 66a which may be provided for example as a pair of buffer registers. The DCU register 66a provides input data to the math unit 70 via a bus 90 having a thirteen bit bus width.

In an alternative embodiment, rather than storing the learned data in the prototype array 68, cell information may be rapidly downloaded to the prototype array 68 from an external source without changing on board stored constants. Thus the network 80 may process memories involving many more than 1024 second layer cells by serial downloading of all information.

A prototype parameter flash random access memory (PPRAM) 72 may be provided as a volatile memory block in which the prototype parameters for each prototype in the prototype array are stored. The PPRAM 72 may be organized as a 48 bit memory block provided as 3 16 bit sub-blocks. In the first 16 bit sub-block is stored the smoothing factor σ, the class type, an indicator of whether the region of influence of the prototype corresponds to the minimum allowable distance ($\lambda_{mim}$) and an indicator of whether the prototype is used or available. In the second 16 bit sub-block is stored the threshold values (λ) and an indicator of whether the prototype is defective. In the third 16 bit sub-block is stored the count values.

Prior to shutdown of network 80, the prototype parameters may be transferred from the volatile memory 72 to the nonvolatile prototype memory 68. The nonvolatile memory 68 may therefore be used to store parameters associated with each prototype before powerdown.

The nonvolatile memory 68 insures that learning information generated by the neural network 80 during the learning mode may be restored on powerup without downloading such information from an external source. The results of the learning process are thus self contained in the neural network 80.

The memory 68 may be provided, for example, having 64K 16-bit words. Only 48K words are required to store the parameters normally associated with the prototypes. Thus, 16K words of unused storage locations exist in the memory 68 and may be available for storage of other parameters which may be accumulated during the neural network learning mode.

The values stored in the PPRAM 72 are stored as 16 bit value. The prototype array 68 however is provided having 5 bit cells. Thus, to transfer the data from the PPRAM72 to the prototype array 68 each 16 bits of data in the PPRAM72 may be stored in 20 bits of defective or unused cells in the prototype array 68.

That is, a 16 bit word from the prototype parameter RAM 72 is stored in a packed form in the prototype array 68 in such a way as to permit recovery of the data upon power-up. That is, upon power-up of the network 80, the PPRAM data stored in the prototype array 68 may be recovered from the prototype array 68 and returned to the PPRAM 72.

In particular, each sixteen bit word from the prototype parameter RAM 78 is stored in four five bit cells of the prototype array 68. The four five bit cells thus provide 20 bits in the prototype array 68 in which data from the PPRAM 72 may be stored.

The four five bit cells may be linked together by setting some of the bits in each of the prototype elements to provide a link list. To provide the link list, four bits of each five bit cell is used to store the data. The fifth bit in each cell points to an address location of the next cell in the linked list having the next 4 bits of PPRAM data. Thus, each cell in the link list points to another cell in which related data from the PPRAM 72 is stored.

The math unit 70 includes a computation portion 70*a* and a math unit RAM 71 having class probabilities and a list of firing classes stored therein. The computation portion of the math unit 70*a* accumulates the results of its calculations in the math unit RAM 71. The math unit RAM (MURAM) 71 is thus used to buffer classification results as they are produced by the computation portion 70*a* of the math unit 70.

The math unit RAM 71 may be provided for example as a pair of identical RAM blocks 71*a*, 71*b*. The math unit computation portion 70*a* stores results in a first MURAM 71*a* while the output unit 74 receives output data from a second MURAM 71*b*. Thus pipeline operations may be performed in the math unit 70.

As mentioned above in conjunction with FIG. 3, the MU 70 executes two multiplies, an exponential, a compare and an accumulate in a 5 stage pipeline. In the event the neural network 80 is provided as an integrated circuit, reduced precision integer and floating point representations may be used in the computations to minimize the area required for this circuitry.

Coupled to the microcontroller 76 is the program memory 78 which may be provided as a non-volatile Flash memory having 4K 16-bit words. The program memory 78 may be over written approximately 10K times without wearing out the non-volatile memory elements. An instruction may typically require one or more words of program memory. Here, twelve bits are used to address the program memory 78.

The neural network 80 may be provided as an integrated circuit implementation of the three-layer network described above in conjunction with FIGS. 1 and 2. Trade-offs between input-layer, middle-layer and output-layer dimensions, resolutions of the various calculations, and speed of network throughput may of course be made to provide a neural network integrated circuit having optimized performance characteristics for a particular application.

It has been found that a high dimensional input layer is preferable. For example, it has been found that an input dimension of 256 in an image processing application may permit a single pass classification of 8 edge-feature groups in approximately 30 image sub-windows extracted from a pixel image. It is thus believed that feature resolution of no more than 5 bits in the present invention is sufficient for accurate classification of patterns from several application domains, including but not limited to handprint classification, sea-trial active sonar signals, and speech signals among other typical classification tasks.

As a result of these selections, the input pattern distributions fall within a feature space of 8192 binary dimensions. To encode these distributions, the first-layer weights $X^1_{ij}$ are resolved to 5-bit accuracy. The 1024 middle-layer cells are used to compute distances using the city-block similarity metric described above. The distances may be computed for example by sequentially performing a pair of 512 simultaneous calculations in the DCU 66.

The neural network 80 may operate in one of a plurality of classification modes. For example, the network 80 may operate in the RCE learning and classification mode. The RCE mode of operation is described in U.S. Pat. No. 4,326,259 assigned to the assignee of the present invention and incorporated herein by reference. The neural network 80 may also operate in the PRCE classification mode as described above in conjunction with FIGS. 1 and 1A.

The network 80 may operate in an RCE-only classification mode by setting a logical indicator in each cell in the second layer to a predetermined value for which d is less than a predetermined field of influence distance about cell i. Such logical indicators may be detected serially and a corresponding output bit for each of 64 possible output classes may be set.

The neural network 80 calculates a value indicative of how well the input pattern vector matches each of the 1024 patterns stored in the memory 68. The DCU 66 includes 512 processing units which operate in parallel to calculate the city block distance d between the input vector u and each of the stored prototype vectors P.

Each distance D is compared to a field of influence value λ associated with each prototype P. Prototypes fire when the distance d between the prototype P is less than the value λ. Thus, if the distance D is less than the field of influence value λ a logical indicator (e.g. a bit) takes on a predetermined value to indicate that this particular prototype has fired.

Each prototype P has a class associated with it. If only one prototype fires or if only prototypes associated with one class fire, then classification may be performed in the RCE mode. Classification in the RCE mode is relatively easy since the neural network 80 may simply provide an output signal indicating the class associated with the firing prototype or prototypes. Thus, the fire/no-fire RCE classification approach works well for simple pattern classification problems where class distributions do not overlap.

When class distributions overlap, however, prototypes from more than one class are likely to fire at the same time creating uncertainty as to which class the input pattern belongs. Thus, in this instance it would be desirable to operate in the PRCE classification mode which, as mentioned above, is the second classification paradigm which may operate in the neural network 80.

In the PRCE mode of operation the math unit 70 is used in conjunction with the prototype array 68 and the DCU 66 to calculate class probabilities. The MU 70 uses the distances d calculated by the DCU 66 along with weight parameters stored during learning in the prototype array 68 to estimate the probabilities. An output signal corresponding to a class probability value may be provided by the neural network in 32 bit IEEE floating point format for example.

Final classification based on the probability values provided by the neural network 80 may be computed by a system administrator (not shown). The probabilities may be normally ranked and the most probable class may be chosen as is in common Bayesian classification.

As will be described further in conjunction with FIG. 5, in parallel when a plurality of neural networks 80 are coupled together, the consolidation of class probabilities from the plurality of networks 80 involved in classifying a single pattern may also be performed by the system administrator (not shown).

The internal (prototype) layer of the neural network 80 is common to the RCE mode and the PRCE mode. The function of the prototype layer is to evaluate the similarity between an input vector and the weights stored in the prototype layer. The neural network 80 uses the city block distance as a similarity criteria and computes this distance for each of the 1024 prototype elements (all of the same dimension) in two 512 parallel computations.

The input layer accepts an input vector and presents it to the prototype layer. Each prototype element in the neural network's internal layer is used by the DCU to calculate the city block distance between the input vector and each of the stored weights.

$$d^1 = \Sigma_i |u_i - P_i^j|$$

where d is the city block distance between the input vector (u) and the stored feature example (prototype vector:p), j is the prototype element index (which may range from 1 to 1024 for example) and i is the dimension index (which may range from 1 to 256 for example). When the input vector u is similar to the stored prototype vector $p^1$, the metric $d^1$ will be small.

Defective prototype elements in the prototype array may be identified and therefore not used to commit new prototypes. Nonfunctional prototype elements may be identified during testing of the neural network and/or at commit-time. Thus, in operation the prototype array 68 appears to have no defective cells.

This ability to reconfigure the parallel array (i.e. automatically identify and avoid defective cells) ensures system integrity when the network 80 is required to operate with a prototype array 68 having defective cells or when the network 80 is required to operate over a relatively long period of time during which defects may occur in the prototype array 68.

Associated with each prototype element j is a field of influence value $\lambda^1$ to which the metric $d^1$ will be compared. When the metric $d^1$ is less than the region of influence $\lambda^1$, a match has occurred between the input vector and the stored feature example. Each prototype belongs only to one class. The class output is simply the result of performing a logical comparison between each of the relevant prototype's thresholded distance calculations. When the input vector matches a feature stored at a prototype in RCE mode of operation, when an input vector closely matches one of the prototype weights stored in the prototype array 68, one of the class outputs will provide a corresponding output signal.

In the situation when an input vector causes more than one class to produce a positive response (due to ambiguous features), the neural network will no longer provide an unequivocal classification based on the RCE strategy. In this case, the neural network could enter the PRCE classification mode. The PRCE calculations may be performed in parallel with RCE classification operations.

The neural network 80 is here able to accept 256 features presented to the input buffer 82. The features may be represented as 5 bits of a single byte. Thus, if an 8 bit byte is used, each 5 bits out of the 8 bit byte represents a single feature.

By allowing the buses 87a and 75 to transfer 20/40 bits or 32/64 bits respectively, a high degree of utilization is maintained on each of the buses 87a and 75 and the network 80 may operate in either a 32 bit or a 64 bit mode. Since 4 bytes corresponds to 20 bits, in the 32 bit mode, 4 features per cycle may be processed in the network 80. Similarly, 8 bytes corresponds to 40 bits and in the 64 bit mode, 8 features per cycle may be processed in the neural network 80. Thus, for problems requiring 256 input features, in the 32 bit mode 64 cycles would be required to load all 256 features. In the 64 bit mode, however, only 32 cycles would be required to load all 256 features.

It should be noted that the prototype array 68 may be addressed as a row column memory array (i,j) similar to a core memory. However, the prototype array 68 is parallel addressable. Here the prototype array 68 is taken to be 256 rows×1024 columns and the features are represented by 5 bits. One of ordinary skill in the art, however, will recognize that the techniques described herein are applicable to prototype arrays 68 of varying dimensions. Likewise, the input buffer 64 and the prototype parameter RAM 72 may each be provided having appropriately selected dimensions and a corresponding number of memory locations. Likewise, the DCU 66 may be provided having an appropriately selected number of computation units. Similarly, each of the buses to be described in conjunction with FIG. 4A below would be provided having an appropriately selected bus width. Furthermore, and as mentioned above, although each feature of the input vector is here represented by 5 bits the features may alternatively be represented by fewer or more than 5 bits.

The distances calculated in the DCU 66 are stored in DCU memory register 66a having one thousand twenty four 13 bit registers. The DCU register 66a may be provided, for example, by a pair of 512 13 bit registers such that computations may begin in the math unit 70 while distance calculations are being performed in the DCU 66.

Figure 4A:
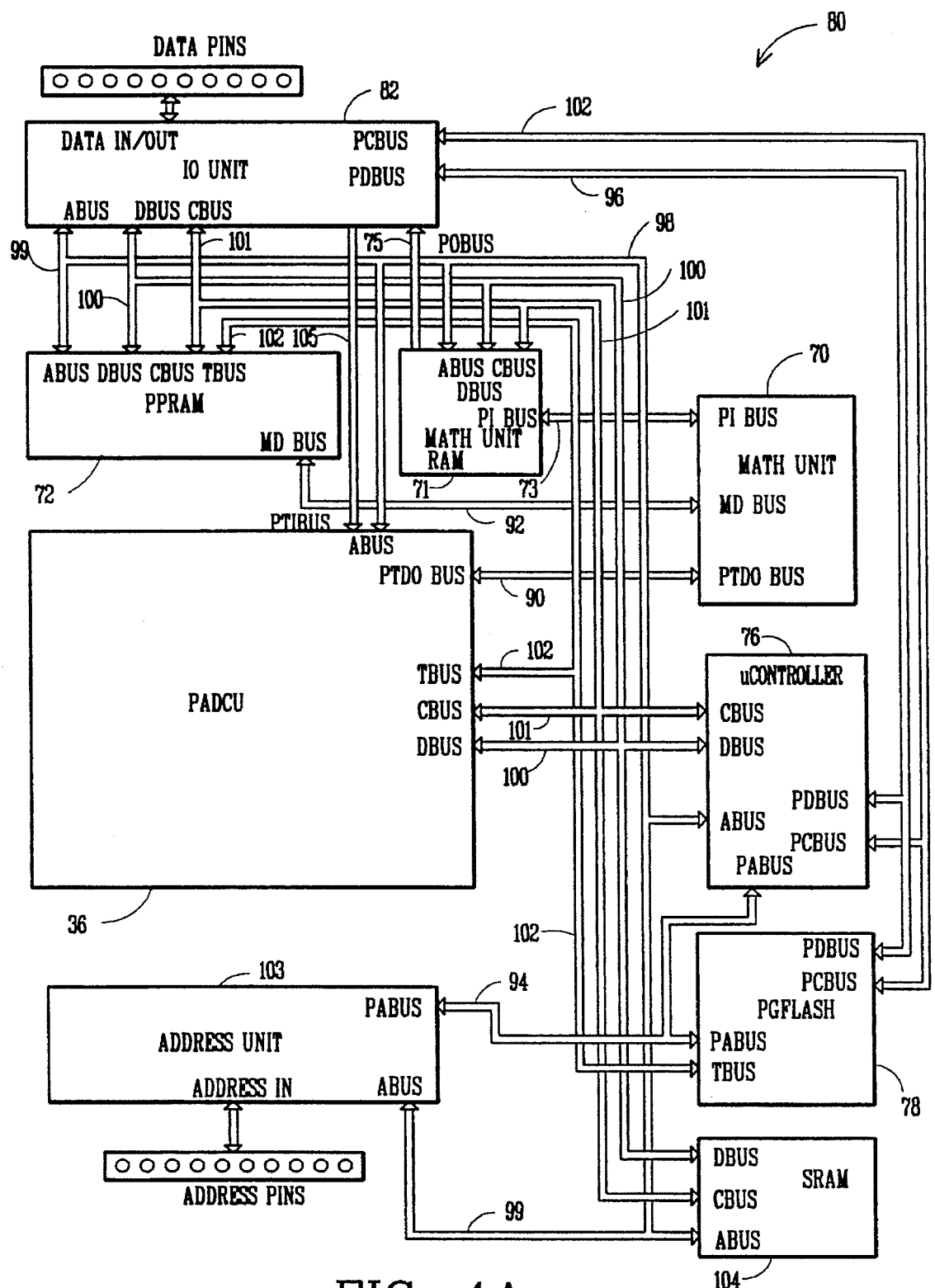
FIG. 4A is a block diagram of a bus architecture used in the neural network of FIG. 4.

Referring now to FIG. 4A in which like elements of the neural network 80 described above in conjunction with FIG. 4 are provided having like reference designations, the neural network 80 includes a plurality of buses. A control bus (CBUS) 101 is coupled between the I/O unit 82, the microcontroller 76 and an SRAM 104 which provides a working RAM for the microcontroller 76. The control bus 101 controls data loading from an external system (not shown) into the microcontroller program memory 78.

A data bus (DBUS) 100 is also coupled between the I/O unit 82, the microcontroller 76 and the program memory 78. Data from an external source (not shown) is loaded into the microcontroller program memory through the data bus 100. The data bus 100 is coupled to the microcontroller because in a test mode and special control modes of the network 80, the microcontroller 76 accesses the data bus 80 to control operations in the network 80.

The microcontroller 76 is provided having separate memory space for storage of program and data space information. Thus, an address bus 99 coupled between the I/O unit 82, the prototype parameter RAM 72, the microcontroller 76, an SRAM 104, and an address unit 103 permits the microcontroller 76 to address any memory mapped unit in the neural network 80. The address unit 103 permits an external source device to access the neural network elements connected to the address bus 99.

A program counter address bus 94 coupled between the address unit 103, the program memory 78 and the microcontroller 76 permits the microcontroller 76 to address program memory. The program counter address bus (PABUS) 94 may also be controlled by the address unit 103 when loading data from an external system.

A data bus (DBUS) 100 and a control bus (CBUS) 101 are each coupled between the I/O unit 82, prototype parameter RAM 72, math unit 70, PADCU 86, the microcontroller 76 and the SRAM 104. The data bus allows the transfer of data between any memory mapped unit in the network 80. Here the data bus 100 is provided as a 16 bit bus. The control bus allows examination of the state of major units within the network.

An analog test access bus (TBUS) 102 coupled between the prototype parameter RAM 72, PADCU 86, and program memory 78 is used as a test bus for each of the flash memory elements the neural network 80 and also provides access to the prototype parameter RAM 72. The test bus 102 permits analog signals within the neural network to be examined.

A prototype input bus (PTIBUS) 105 coupled between the I/O unit 82 and the PADCU 86 allows data to be transferred, one feature at a time to the DCU. The prototype input bus 105 is dedicated to such transfers.

A memory data bus (MDBUS) 92 coupled between the PPRAM 72 and the math unit 70 enables the math unit 70 to access all three prototype parameter memories simultaneously. Here the memory data bust 92 is provided as a 48 bit bus.

An output bus (POBUS) 75 is coupled between the math unit RAM 71 and the I/O unit 82 is dedicated to transferring data from the math unit RAM 71 to the output portion of the I/O unit 82.

A PTDO bus 90 coupled between the PADCU 86 and the math unit 70 is used to access the distance registers in the DCU and transfer data to the math unit 70.

Data is transferred between the math unit and the math unit RAM via a two way PI bus 73.

The microcontroller 76 uses separate address and data buses (PABUS and PDBUS) to access it program memory. All other memory blocks and registers on the neural network 80 may be accessed via the ABUS 99 and DBUS 100. The control registers used to control the program memory 78 during programming are accessible only through the external bus interface.

Figure 5:
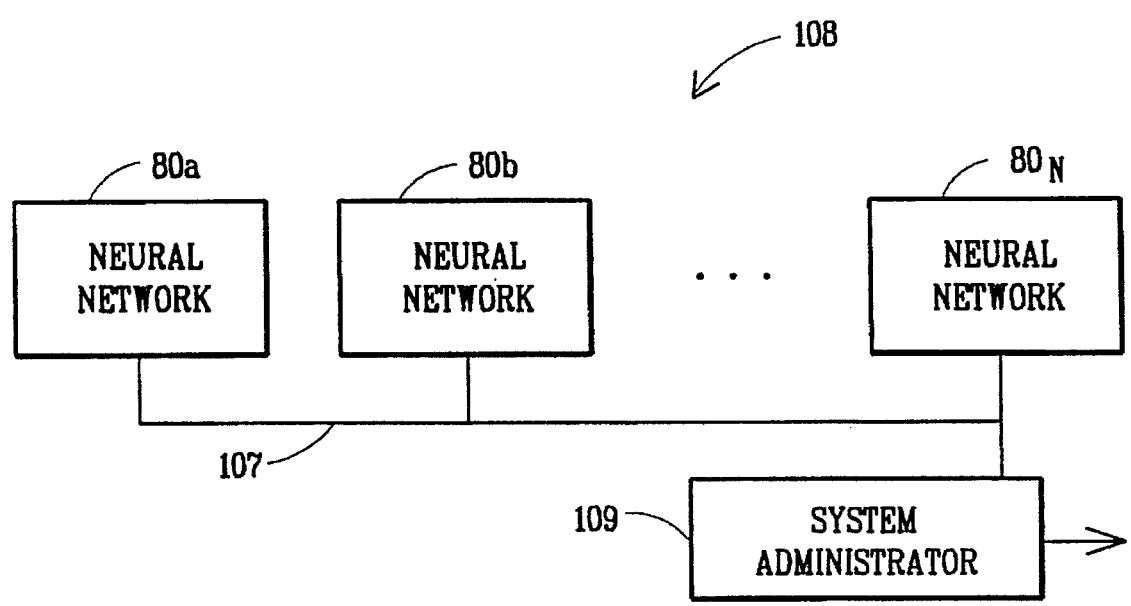
FIG. 5 is a block diagram of a neural network array.

Referring now to FIG. 5, in which like elements of the neural network 80 of FIG. 4 are provided having like reference designations, a neural network array 108 includes a plurality of separate neural networks 80a–80n, generally denoted 80, coupled to a system administrator 109 through address and data bus 107. The system administrator 109 may be provided for example as a personal computer or high speed controller and is used to handle conflicts and communication when more information is required than is already available in an autonomous neural network. The system administrator 109 also controls the flow of I/O to the neural network array 108, and may configure the neural networks 80 into one of a plurality of possible architectures.

The system administrator 109 may be provided as a controller similar to the type described in U.S. Pat. No. 4,760,604 assigned to the assignee of the present invention and incorporated herein by reference.

Generally, the system administrator 109 receives inputs from each of the networks 80 and provides an output signal at an output port thereof. It may be desirable to use such an array of neural networks 80 in those applications having a relatively complex feature space such that the number of prototypes is greater than that which may be stored in one network 80.

As training vectors are presented to the neural network array 108, prototype elements are autonomously assigned until only a single prototype memory element (i.e. 256 five-bit cells) is available. This operation is substantially the same for both single neural network systems and array neural network systems.

In the array environment, however, the act of committing the last prototype memory space causes a signal to be provided to the system administrator 109 to indicate to the system administrator that another unprogrammed network 80 must be placed in the learning mode. This process continues until each of the networks 80 in the array 108 indicates that each of the prototype elements the corresponding prototype array is committed. In a single network system, this occurs when each of the prototype elements in the neural network prototype array 68 is filled.

At this point the system administrator 102 intervenes to indicate that the problem cannot be defined with the given number of networks 80 in the array 108. A user of the system then has several options. First the user may assume that the problem is sufficiently defined to begin classification. Second, the user may add an additional network 80 to the array 108. Third, the user may reorder the training set and attempt to learn it again, or fourth the user may be more selective in choosing the training set.

When committing new prototypes during the learning phase, it is required to initialize the new field of influence to be equal to the new prototype's distance to the closest, already-stored prototype. This distance is denoted $D_{min}$, and it is required to transmit the $D_{min}$'s of all the networks 80 (the $D_{minlocal}$'s) to the system administrator to find the global $D_{min}$ (denoted as $D_{minglobal}$). This value is then relayed to the chip which will commit the new prototype and the value of the field of influence is instantiated. In a classification mode, a normalization factor Q is dependent on the resultant unnormalized probability density from each class. In this case, the Q's from each of the neural networks 80 should be summed to generate the global system normalization factor, $Q_{global}$. The probability values $P_j$ are then divided by $Q_{global}$ to create normalized probabilities.

One problem in network arrays which slows the operation of such arrays is the transmission of $D_{minlocal}$ during the learning phase, and the transmission of 64 $P_{local}$'s and the $Q_{local}$ during the classification phase. Each of the neural networks 80 in the neural network array 108 supports a protocol in which the local controller 109 provides the $D_{minlocal}$ values from each of the neural networks 80a–80n to all of the other networks 80a–80n. Thus, the neural network 80a, for example, receives the $D_{minlocal}$ values from each of the other networks 80b–80n in the network array 109. Each of the neural networks 80a–80n then determine which of the $D_{minlocal}$ has the smallest value. The system administrator 109 thus distributes all the $D_{minlocal}$ values to each of the networks 80a–80n where the appropriate computations are made.

When required, the system administrator 109 polls each chip, prompting it to release its $D_m$ (during learning) or P (during probabilistic classification) to the bus 107. This allows the system administrator 109 to access the data as required. Each of the networks may be accessed individually, such that only a single neural network 80 gains access to the bus 107 during a predetermined time interval.

Figure 6:
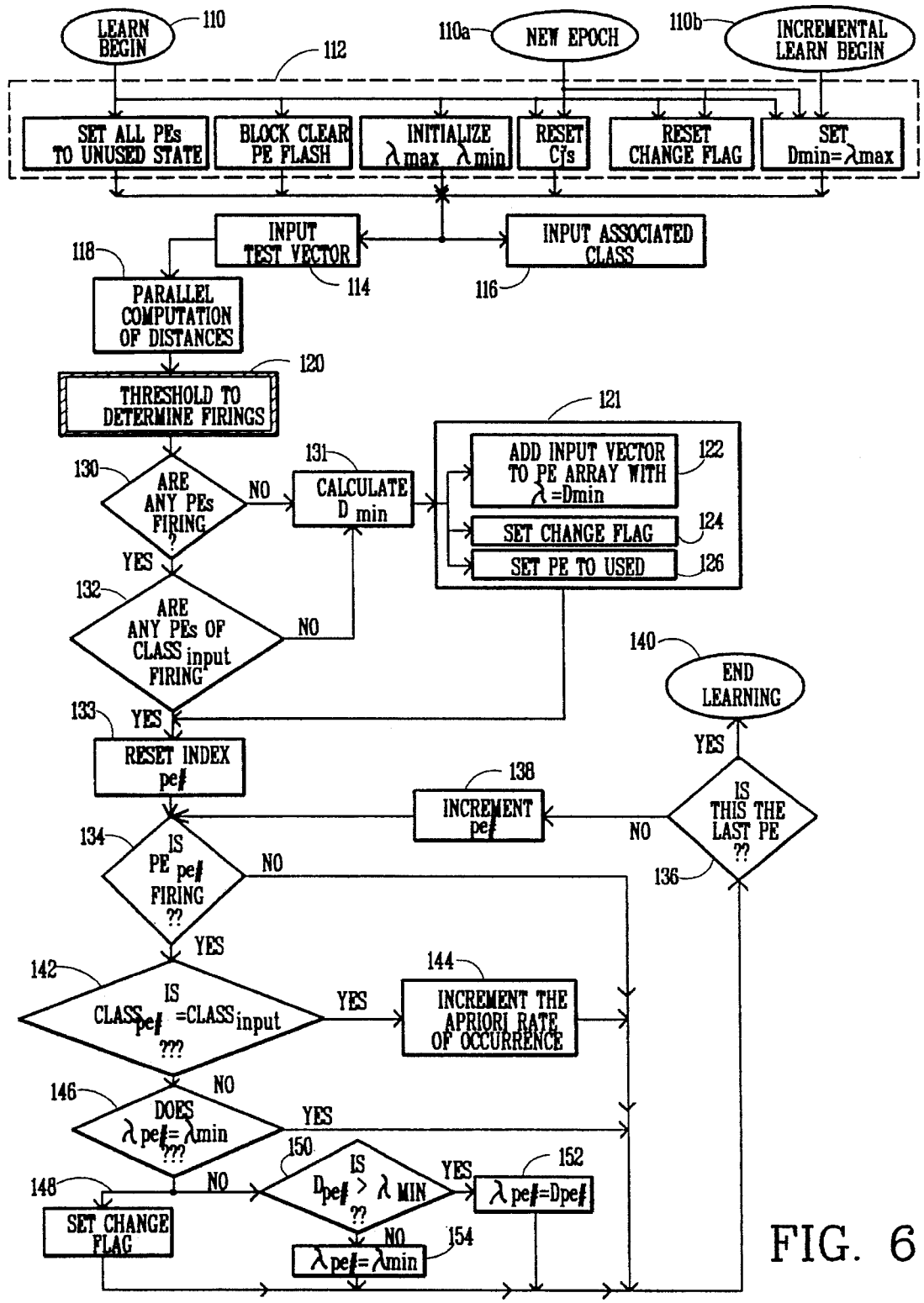
FIG. 6 is a flow diagram of the learning mode processing performed in the neural network of FIG. 4.

FIG. 6 shows a flow diagram of the processing performed in the DCU 66 (FIG. 4) and the math unit 70 (FIG. 4) of the neural network 80 (FIG. 4) to produce prototype values which may be stored in the prototype array 68 (FIG. 4). In the flow diagram, the rectangular elements (typified by element 114) herein denoted "processing blocks" represent steps or instructions or groups of instructions. The diamond shaped elements (typified by element 130) herein denoted "decision blocks" represent steps or instructions or groups of instructions which affect the execution of the steps represented by the processing blocks.

The neural network 80 uses information stored in the prototype memory array and prototype parameter memory described above in conjunction with FIGS. 3–4A above, to carry out its classification calculations. The process by which prototypes are provided to the prototype array memory is generally referred to as learning or adaptation. The term learning is used because the process is related to human learning.

Prior to the use of the neural network for classification, the neural network is placed in a learn mode via a learn command and example patterns are presented to the neural network along with a correct identification of the class to which each pattern belongs. The microcontroller examines the classification results and compares them to the desired classification. The microcontroller then decides how to change the information stored in the neural network. The microcontroller may store the example vector as a prototype vector in the prototype array or the microcontroller may modify the parameters associated with some of the prototypes which have already been stored in the prototype array memory. Non-volatile flash memory may be used to store information captured during learning. The learning controller's program may also be stored in a flash memory.

As described in detail in U.S. Pat. No. 4,326,259 assigned to the assignee of the present invention and incorporated herein by reference, RCE learning is a process of committing a set of prototypical weights from training data and assigning an appropriate field of influence $\lambda_i$ and threshold value for which those weights are representative. During the learning mode, the neural network determines if a new input vector is a prototypical example. If the new input vector is a prototypical example, then the network commits a new prototype element and assigns the prototype element an appropriate influence field $\lambda$. Concurrently, an attempt is made to reduce the value of the fields of influence $\lambda$ of other prototype elements until conflicts with the new prototype element are avoided. This procedure of reducing influence fields $\lambda$ continues until a predetermined minimum influence field value $\lambda_{min}$ is reached.

In the present invention, to address the case when class boundaries overlap and a probabilistic response is desired, probability density functions may be computed in the learning mode. The apriori rates of occurrence are computed using the training feature examples. The neural network assumes a distribution function which takes the form of a decaying exponential for the purpose of learning.

As described above in conjunction with FIG. 4 the neural network 80 may operate in one of a plurality of classification modes. For example, the network may operate in the RCE and PRCE classification modes.

Multiple passes through the training examples are employed in the learning process. Each pass is referred to as an "epoch". In the present invention, during each epoch in the learning mode, the network assembles all information, including probabilistic information, needed for the neural network to operate in each of the plurality of classification modes. Thus, with no additional delay in training time, the network is able to operate in a plurality of classification modes e.g. either the RCE or PRCE classification modes.

Several iterations (typically in the range of about 3–6 iterations) of the data (i.e. epochs) may be required to achieve system stability. That is, several iterations may be required before no new prototype elements are added to the network and none of the regions of influence are adjusted. The probabilistic information obtained during learning is not used until the network operates in the classification mode. In the classification mode, if a conflict among the output classes occurs the probabilistic information may then be used.

Other learning algorithms, such as the Probabilistic Neural Network (PNN) learning algorithm for example, may optionally be used by downloading microinstructions to a user-accessible portion of the microcontroller's program flash memory array. The user may access the new algorithm in a manner identical to the manner in which RCE/PRCE learning algorithms are accessed and thus use the alternate algorithm in place of the standard learning code. If alternate algorithms having mathematical operations similar to the RCE learning algorithm are used, maximized performance of the parallelized computation scheme described above may be maintained.

Turning now to FIG. 6, entry point 110 initiates an initial learning step. In response to the initial learning step all prototype memory will be initialized and overwritten. Thus, the initial learning step should only be used for an initial input vector of an initial epoch provided to the network 80. Subsequent learning steps should be initiated via the new epoch or incremental learning entry points 110a, 110b. Processing block 112 performs an initialization procedure to indicate that the learning mode is beginning. Depending upon which of the entry points 110–110b are used to begin processing at the first learning process step, particular values are initialized. For example if the learning process is initiated through entry point 110 then in initialization processing block 112, all prototypes are set to indicate an unused state, the memories are cleared and the value $D_{min}$ is set equal to a maximum region of influence value $\lambda_{max}$.

In processing blocks 114 and 116 an input vector from a training set and an associated class is presented to the network. The input vector is latched from the data bus and stored in the input buffer.

In processing block 118 the DCU performs a parallel computation of the distances between the current input vector and each of the prototypes stored in the prototype array. Processing then continues in processing block 120 where computations of threshold values to determine which prototypes stored in the prototype array activate are performed.

After the threshold values are computed, in decision block 130 the neural network checks to see if any prototypes stored in the prototype array are firing. If no prototypes are firing then processing continues in processing block 131 where a minimum distance $D_{min}$ is computed. Processing then continues in commitment processing block 121 and the operations in processing blocks 122, 124 and 126 are performed.

In processing block 122 an input vector having a region of influence $\lambda = D_{min}$ is added to the prototype array. In processing block 124 a CHANGE flag in a register is set. When the CHANGE flag is set, this indicates that another training epoch is required. The CHANGE flag may be set in response to either one of two conditions being met. First, the CHANGE flag is set if a new prototype is added to the prototype array. Second, and as will be described in conjunction with processing block 148, the CHANGE flag is set if the value of a region of influence for any prototype is adjusted. After the appropriate operations are performed in processing block 121 processing continues to processing block 133.

If at least one prototype is firing however, then processing flows to decision block 132 where the neural network checks to see if any prototypes of the same class as the input vector are firing. The computations necessary to determine such classifications are performed in pipeline fashion. If no prototypes of the same class as the input vector fired, then processing again flows to processing blocks 131 and 121 where processing steps as described above are performed.

Regardless of whether any prototypes of the input class are firing, processing then continues in processing block 133 where an index pe# is reset. The index pe# is used as a loop counter to be certain that each of the prototype elements are accessed.

Decision blocks 134,136 and processing block 138 implement a loop in which each prototype element P is checked to see if it has fired. The loop and consequently the learning process end in processing block 140 after each of the prototype elements has been checked.

Thus, decision block 134 checks to see if a particular prototype $P_{pe\#}$ defined by the index pe# is firing. If the particular prototype $P_{pe\#}$ defined by the index pe# is not firing then processing continues to decision block 136 to check if this prototype is the last prototype. If it is the last prototype then learning ends as shown in processing block 140.

If it is not the last prototype, then processing continues in processing block 138 where the index pe# corresponding to the prototype number is incremented and decision block 134 checks to see if the next prototype is firing. This loop continues until all the prototypes are checked.

If a prototype is firing, then in decision block 142 the class of the prototype $Class_{pe\#}$ is compared to the class of the input vector $Class_{input}$. If the class of the current prototype $Class_{pe\#}$ is the same as the class of the input vector $Class_{input}$ then the apriori rate of occurrence for that class is incremented in processing block 144. For overlapping class distributions, pdfs may be estimated by maintaining a count of correctly classified patterns which fall within the region of influence of each of the middle layer of cells. This local counter of correctly classified patterns is stored in the second layer weight $\omega^2_{ij}$ which links the $j^{th}$ cell of the middle layer with the $i^{th}$ output cell. Thus during training, correctly identified patterns of class i, which elicit activity in middle-layer cell j, cause an increment to the value of the weight $\omega^2_{ij}(t)$ as shown in Equation 7 in which t represents time.

$$\omega^2_{ij}(t+1)=\omega^2_{ij}(t)+1 \qquad \text{Equation (7)}$$

Patterns which are not correctly identified by middle-layer cell j do not alter the value of the weight $\omega^2_{ij}(t)$. It should be noted that since the field of influence $\lambda_j$ of cell j may be reduced as a result of RCE learning, the counter $\omega^2_{ij}$ may not provide an accurate estimate of correctly identified patterns during RCE training. Thus to ensure that the second layer of weights correctly estimate the local pdfs, it may be preferable to perform a final pass on the full training set in which no addition of second layer cells and no adjustment of the field of influence $\lambda$ of any cell occurs.

If in decision block 142 the class of the current prototype $Class_{pe\#}$ is not equal to the class of the input vector $Class_{input}$ then processing continues to decision block 146 where a check is made to determine if the value of the field of influence $\lambda_{pe\#}$ around that particular prototype is set to the minimum value $\lambda_{mim}$. If the value of the field of influence $\lambda_{pe\#}$ is set to the minimum value $\lambda_{min}$ then processing continues to decision block 136.

If the result of decision block 146 indicates that the value of the field of influence $\lambda_{pe\#}$ is not set to the minimum value $\lambda_{min}$, then the change flag is set in processing block 148 to indicate that the value of the region of influence $\lambda_{pe\#}$ of this particular prototype has been adjusted.

In decision block 150 the distance of the current prototype corresponding to the present value of index pe#, $D_{pe\#}$ is compared to the value of the minimum region of influence $\lambda_{min}$. If the value of the distance $D_{pe\#}$ is greater than the minimum region of influence value $\lambda_{min}$, then the value of the region of influence for this particular prototype $\lambda_{pe\#}$ is set equal to the computed distance value $D_{pe\#}$ as shown in processing block 152 and processing then continues to decision block 136.

If in decision block 150 the value of the distance $D_{p\#}$ is less than the minimum allowable value of the field of influence $\lambda_{min}$, then value of the field of influence for this particular prototype $\lambda_{pe\#}$ is set equal to m as shown in processing block 154 and processing then continues to decision block 136.

If an output cell of a different class than the input pattern is activated, then the field of influence values $\lambda$ of the middle-layer cells which activated the output cell are adjusted such that those cells are no longer activated by the pattern. In addition, if none of the middle-layer cells connected to the correct output cell are active, then a new cell is added to the network with weights $\omega_{ij}$ which correspond to the location of the pattern.

At the same time, the new cell is connected to the corresponding output layer cell with a unit weight. The value of the field of influence of the new cell is then initialized to the distance between the input pattern and the nearest weight vector of a cell belonging to another class.

As a result of the learning procedure, the cells of the second layer of the network form a "covering" of the class regions that can represent arbitrarily non-linear interclass boundaries. This mapping of the training data distributions typically requires from three to six passes through a randomly ordered training set, depending of course upon a variety of factors including but not limited to the complexity of the distributions and the ordering of the data in the training set.

Figure 7:
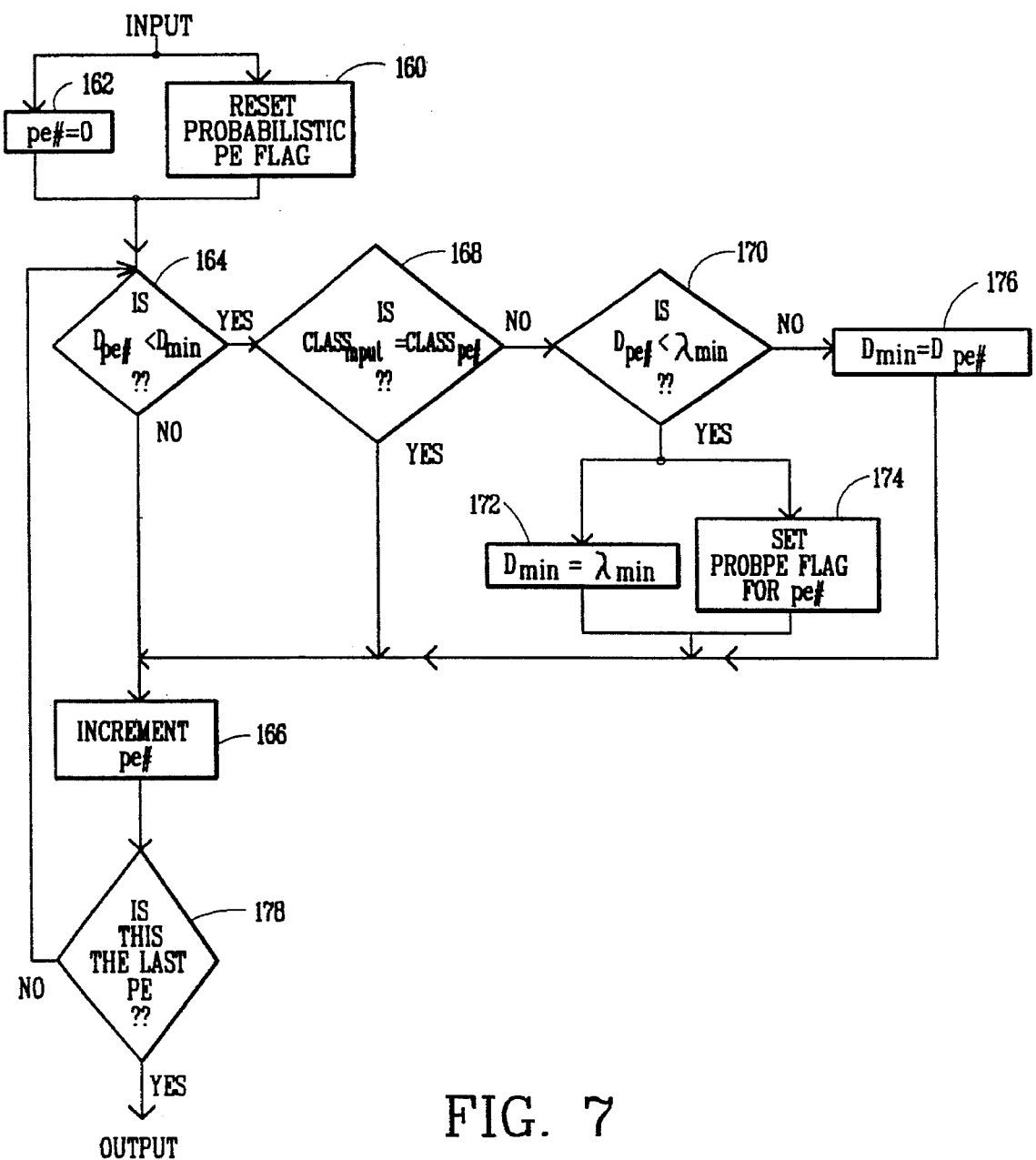
FIG. 7 is a flow diagram of the processing performed in the neural network of FIG. 4.

Referring now to FIG. 7, a flow diagram of the processing performed by the neural network 80 (FIGS. 4 and 4A) to compute the distance $D_{min}$ between an input pattern and all the prototypes not in the same class is shown. Processing block 160 indicates whether the minimun distance $D_{mim}$ is equal to the minimum field of influence $\lambda_{min}$. In processing block 162 the prototype index pe# is initialized.

In decision block 164 the distance value $D_{pe\#}$ is compared with the current minimum distance value $D_{min}$. If the value of $D_{pe\#}$ is greater than the value of $D_{min}$ then processing continues to processing block 166 where the prototype index is incremented. If the value of $D_{pe\#}$ is less than the value of $D_{min}$ then processing continues to decision block 168 where $Class_{input}$ is compared to $Class_{pe\#}$. If $Class_{input}$ equals $Class_{pe\#}$ then processing again flows to processing block 166. If $Class_{input}$ is not equal to $Class_{pe\#}$ then processing flows to decision block 170 where the value of $D_{pe\#}$ is compared with the value of $\lambda_{min}$.

If the value of $D_{pe\#}$ is less than or equal to the value of $\lambda_{min}$ then the value of $D_{min}$ is set equal to $\lambda_{min}$ in processing block 172 and the PROBABILISTIC PE flag is set in processing block 174 to indicate that the value of $D_{min}$ equals the value of $\lambda_{min}$. Processing then flows to processing block 166 where the index counter pe# is incremented.

If the value of $D_{pe\#}$ is greater than the value of $\lambda_{min}$ then processing flows to processing block 176 and the value of $D_{min}$ is set equal to the value of $D_{pe\#}$ and processing again flows to processing block 166.

After the prototype number is incremented in processing block 166, decision block 178 implements a loop to repeat the steps above until each prototype has been processed.

Figure 8:
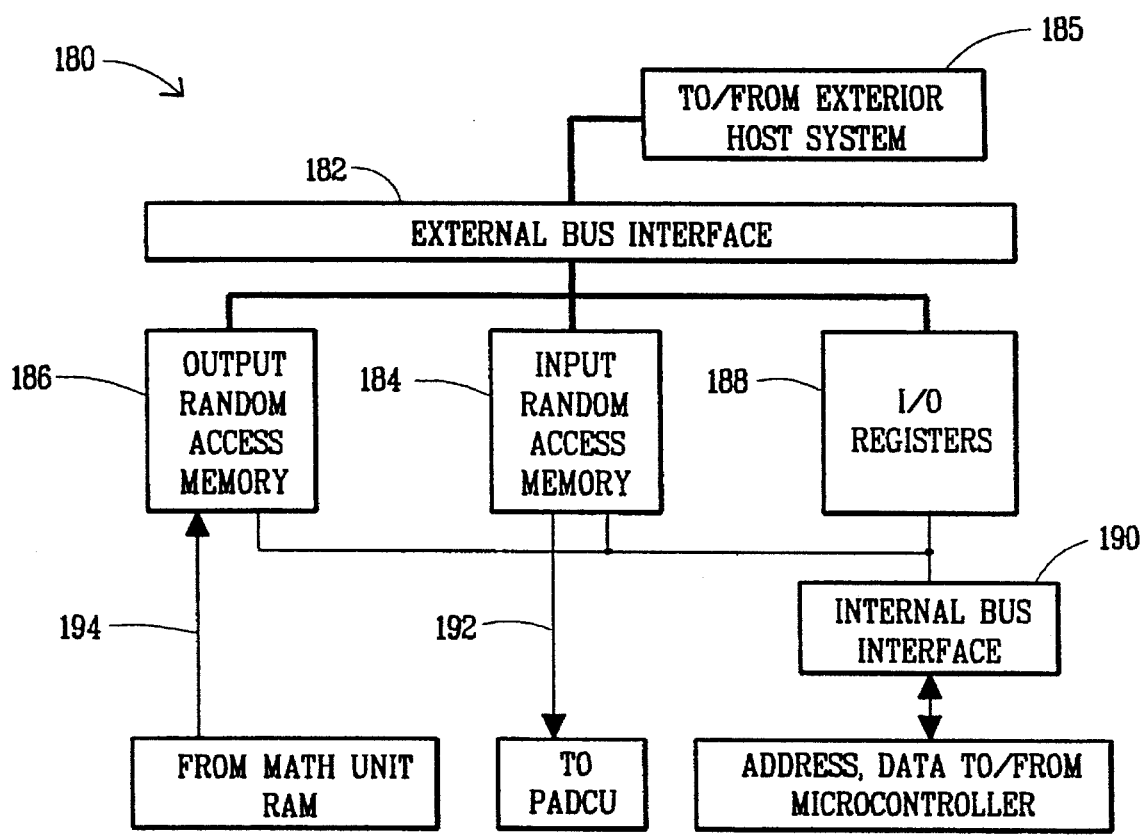
FIG. 8 is a block diagram of the input/output random access memory in the neural network of FIG. 4.

Referring now to FIG. 8 the I/O unit 180 of the neural network includes an input RAM buffer (IRAM) 184 which receives from a host system 185 pattern vectors for classification. The I/O unit further includes the output RAM buffer (ORAM) 186 which receives classification results from the neural network's internal classification pipeline and stores the results prior to transferral of the results to the host system 185. The I/O unit 180 further includes input/output (I/O) registers 188, which have the dual function of controlling the operating modes of the IRAM 184 and ORAM 186, and of acting as "mailboxes" to communicate information between the host system and the neural network's internal elements (e.g. the neural network microcontroller).

The IRAM 184, ORAM 186 and I/O registers 188 comprise the three principal external data path elements of the neural network 80 (FIG. 4). These three sub-units of the I/O unit 180 communicate with the host system 185 through an external bus interface (XBI) 182. These three sub-units of the I/O unit 180 also communicate with the microcontroller through an internal bus interface (IBI) 190.

When the network 80 (FIG. 4) operates in a classification mode, a first direct interface 192 exists between the IRAM 184 and the PADCU 86 (FIG. 4). Similarly a second direct interface 194 exists between the math unit RAM 71 (FIG. 4) and the ORAM 186.

Changes in the apparatus and methods herein disclosed will occur to those skilled in the art and various modifications and embodiments are envisioned which may be made without departing from the scope of the invention. The matter set forth in the foregoing description of the disclosed neural network and the accompanying drawings is offered by way of illustration. Consequently, the invention is to be viewed as embracing each and every novel feature and novel combination of features disclosed herein and is to be limited solely by the scope and spirit of the appended claims.

What is claimed is:

1. A method of training a neural network having an input layer, a middle layer and an output layer, comprising the steps of:

(a) presenting an input vector having a plurality of training features to the neural network;

(b) computing distances between a plurality of said training features and a plurality of prototype weight values;

(c) generating, for each prototype weight value, a count value corresponding to a number of occurrences of an input vector that falls within a region of influence of a particular prototype;

(d) repeating steps (a)–(c) until the neural network provides an indication of a last training epoch; and (e) in response to the indication of the last training epoch, storing, in a memory, the count value for each of the prototype weight values.

2. The method of claim 1 wherein the step of storing the count value corresponding to the number of occurrences of an input vector within a prototype includes the step of storing the count value in a memory location corresponding to a register for the storage of a middle layer weight value.

3. The method of claim 2 wherein the count value corresponds to a scalar value.

4. The method of claim 1 wherein the distances computed in said computing step are computed concurrently.

\* \* \* \* \*

UNITED STATES PATENT AND TRADEMARK OFFICE
CERTIFICATE OF CORRECTION

PATENT NO. : 5,479,574        Page 1 of 2
DATED : December 26, 1995
INVENTOR(S) : Michael T. Glier, et al.

It is certified that error appears in the above-identified patent and that said Letters Patent is hereby corrected as shown below:

Column 1, line 51, "Computes" should read --computes--.

Column 3, line 15, "coulomb" should read --Coulomb--.

Column 4, line 33, "training" should read --training.--.

Column 6, line 10, "$2^\epsilon$is" should read --$2^{-\epsilon}$ is--.

Column 6, line 3 , "$U_1 - U_n$" should read --$U_1 - U_N$--.

Column 7, line 19, "1024" should read --1024--.

Column 8, line 55, "256" should read --256--.

Column 9, line 13, "$(\lambda_{mim})$" should read --$(\lambda_{min})$--.

Column 9, line 38, "PPRAM72" should read --PPRAM 72--.

Column 9, line 39, "PPRAM72" should read --PPRAM 72--.

Column 13, line 59, "bust 92" should read --bus 92--.

Column 15, line 12, "$D_{minlocal.}$ values" should read --$D_{minlocal}$ values--.

Column 18, line 26, "$\lambda_{mim.}$" should read --$\lambda_{min.}$--

Column 18, line 43, "$D_{p\#}$" should read --$D_{pc\#}$--.

Column 19, line 8, "$D_{mim}$" should read --$D_{min}$--.

UNITED STATES PATENT AND TRADEMARK OFFICE
CERTIFICATE OF CORRECTION

PATENT NO. : 5,479,574
DATED : December 26, 1995
INVENTOR(S) : Michael T. Glier, et. al.

It is certified that error appears in the above-identified patent and that said Letters Patent is hereby corrected as shown below:

Column 18, line 43, "$D_{p\#}$" should read --$D_{pc\#}$--.

Column 19, line 8, "$D_{mim}$" should read --$D_{min}$--.

Signed and Sealed this

Twentieth Day of October, 1998

Attest:

BRUCE LEHMAN

Attesting Officer     Commissioner of Patents and Trademarks